Figure 1:
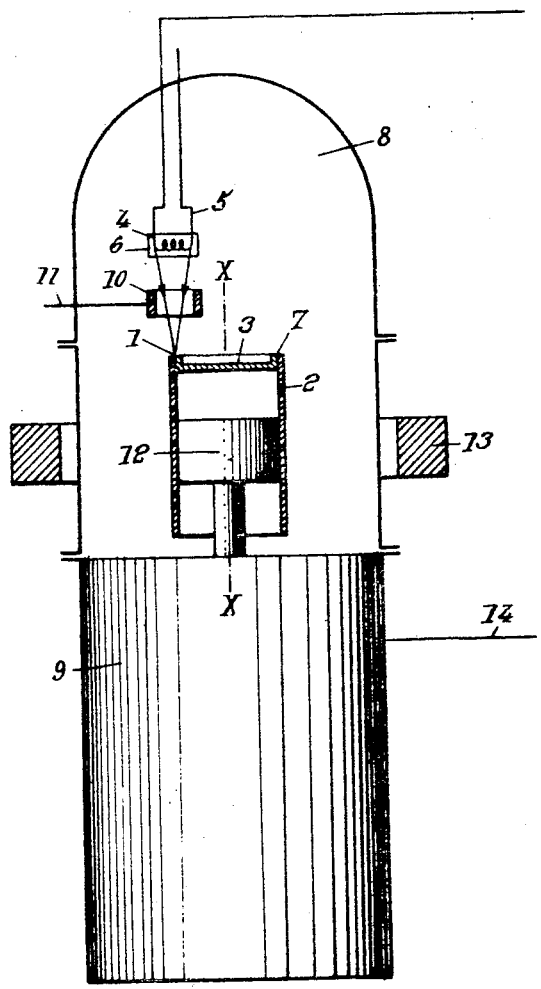

April 12, 1960  J. A. STOHR  2,932,720
METAL WELDING METHODS

Filed Jan. 17, 1957  2 Sheets-Sheet 1

April 12, 1960  J. A. STOHR  2,932,720
METAL WELDING METHODS

Filed Jan. 17, 1957  2 Sheets-Sheet 2

United States Patent Office 2,932,720
Patented Apr. 12, 1960

2,932,720
METAL WELDING METHODS

Jacques André Stohr, Bures-sur-Yvette, France, assignor to Commissariat a l'Energie Atomique, State Administration, Paris, France Application January 17, 1957, Serial No. 634,677

Claims priority, application France January 19, 1956

1 Claim. (Cl. 219—72)

The present invention relates to methods for welding metals.

Its chief object is to eliminate any risk of oxidation of the metals during their welding.

It is essentially characterized by the fact of placing in a space where a high vacuum can be achieved, on the one hand the metal pieces to be welded together, and on the other hand a source of electrons capable of bombarding said pieces, means being provided to give the area of impact of said electrons on said pieces dimensions which are quite definite and adjustable and to displace in any desirable fashion this impact area (in which the metal pieces are melted), with respect to said pieces, in particular in such manner as to place it at any time on a line along which welding is to be performed.

It should be reminded that, during welding operations, it is necessary to protect the metals to be welded against oxidation by making use of a suitable atmosphere.

Such an atmosphere may be constituted by gases, such as argon or helium, which are chemically neutral with respect to the metals to be welded. But this solution necessitates a perfect purification of these gases, which is difficult to obtain for spaces of relatively large volume.

Vacuum, or highly rarefied atmosphere, also complies with the desired protection conditions, but this solution cannot be used in the case of conventional welding methods because a blow-pipe cannot work in a vacuum.

According to the present invention, these drawbacks are obviated by effecting the welding operation by electronic bombardment of the pieces to be welded in an atmosphere which is as rarefied as it may be desired.

All the parameters which may influence the welding operation are made adjustable at will, to wit in particular the intensity of the electronic current, the electron acceleration voltage, the characteristics of the lens or lenses for concentrating electrons, the residual pressure and the nature of the gas present in the space where the operation is effected, the relative displacements between the source of electrons and the pieces, and so on.

Vacuum in the welding space is obtained in any desirable fashion known for the obtainment of a vacuum, for instance by means of blade pumps, diffusion pumps, molecular pumps, and so on.

Welding may be effected—

Either in a continuous fashion, the electronic current being uninterrupted and the area of melting metal moving regularly along the welding line;

Or in a discontinuous fashion, the electron accelerating voltage being periodically cut off and the electronic current being constituted by a succession of impulses: welding is then effected by a succession of spots which partly overlap one another, and the time for which a metal area is subjected to melting is considerably reduced with respect to the case where welding is continuous, which permits of applying a higher energy on every impulse.

Preferred embodiments of the present invention will be hereinafter described with reference to the accompanying drawings, given merely by way of example and in which:

Fig. 1 diagrammatically shows, partly in axial section, partly in elevation, a first embodiment of an apparatus for carrying out the method according to the present invention.

Figure 2:
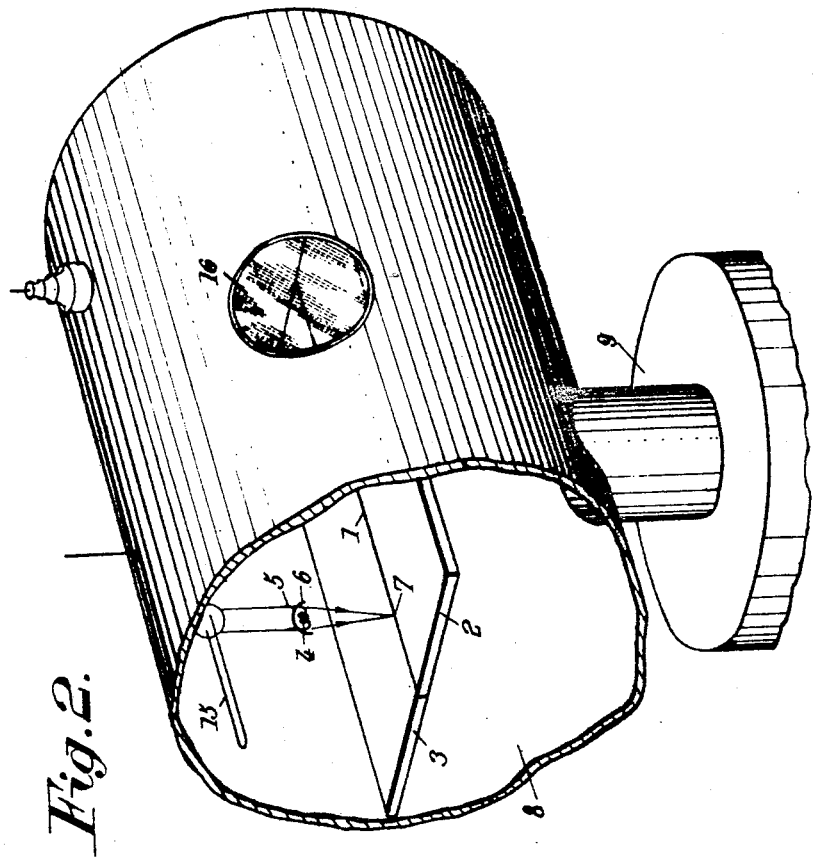

Fig. 2 is a diagrammatic perspective view showing a second apparatus for carrying out said invention.

In both of these examples, 1 designates a line of welding to be obtained, 2 and 3 two metallic pieces juxtaposed along this line 1, 4 the filament of a cathode 5 emitting electrons the flux of which is directed and concentrated by an electronic lens 6 onto the point of impact 7, and 8 a gas-tight enclosure containing the whole of the above stated elements, connected with a pumping device located in casing 9, to keep the vacuum at the desired value.

In the first embodiment illustrated by Fig. 1, acceleration of the electrons is obtained by means of an accelerating electrode 10 constituted by a hollow cylinder. This electrode, maintained by a conductor 11 at a potential higher than that of cathode 5, establishes an electric field capable of accelerating the electrons emitted by this electrode so as to send them onto the impact point 7.

Furthermore, in this example, the weld line 1 is of revolution about the axis XX of the apparatus, the whole of pieces 2 and 3 being rigid with the rotor 12 of a motor, for instance an asynchronous motor the stator of which is shown at 13. Displacement of the weld point is obtained by rotation of pieces 2 and 3 about axis XX, cathode 5 and the parts associated therewith remaining stationary.

A conductor 14, connected with the shaft rotor 12, makes it possible, if necessary, to impart any desired potential to the pieces to be welded 2 and 3.

In the second example illustrated by Fig. 2, the anode is constituted by the pieces to be welded 2 and 3 which, therefore, themselves accelerate the electrons emitted toward them by cathode 5.

The line of welding is in this case rectilinear and it is the cathode which moves, together with its filament 4 and its lens 6, along a bar 15, so as to ensure sweeping of the weld line 1 by the flux of electrons.

A window 16 permits of supervising the operation.

If the weld line had a complex shape, means should be provided, such as sets of cams, in order to displace the point of impact of the electron flux along this weld line.

What I claim is:

The method of welding two solid pieces of metal together which comprises placing, in a vacuum, said two pieces in adjoining relation with respective edges thereof in contact with each other along a line, directing a focussed electron beam onto said line, accelerating said beam along its path to said line, periodically interrupting said beam while producing a relative controlled displacement of said interrupted beam and the whole of said two pieces to cause the beam to travel along said line of contact.

References Cited in the file of this patent
UNITED STATES PATENTS

| | | |
|---|---|---|
| 2,128,581 | Gardner | Aug. 30, 1938 |
| 2,267,714 | Borries et al. | Dec. 30, 1941 |
| 2,267,752 | Ruska et al. | Dec. 30, 1941 |
| 2,778,926 | Schneider | Jan. 22, 1957 |